United States Patent
Kawakami (10) Patent No.: US 9,771,976 B2
(45) Date of Patent: Sep. 26, 2017

(54) CAP OF LINEAR GUIDE DEVICE AND LINEAR GUIDE DEVICE

(71) Applicant: NSK Ltd., Shinagawa-ku, Tokyo (JP)

(72) Inventor: Koichi Kawakami, Saitama (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/912,344

(22) PCT Filed: Feb. 7, 2014

(86) PCT No.: PCT/JP2014/000679
§ 371 (c)(1),
(2) Date: Feb. 16, 2016

(87) PCT Pub. No.: WO2015/033486
PCT Pub. Date: Mar. 12, 2015

(65) Prior Publication Data
US 2016/0201721 A1 Jul. 14, 2016

(30) Foreign Application Priority Data

Sep. 3, 2013 (JP) .................... 2013-182080

(51) Int. Cl.
*F16B 37/14* (2006.01)
*F16C 29/08* (2006.01)
(Continued)

(52) U.S. Cl.
CPC .......... *F16C 29/082* (2013.01); *F16C 33/726* (2013.01); *F16B 37/14* (2013.01); *F16C 29/004* (2013.01); *F16C 29/0647* (2013.01)

(58) Field of Classification Search
CPC .... F16B 37/14; F16C 29/004; F16C 29/0647; F16C 29/08; F16C 29/082; F16C 33/726
(Continued)

(56) References Cited

U.S. PATENT DOCUMENTS 2,968,375 A * 1/1961 Avery, Sr. ................ B23Q 1/26
403/2
5,603,472 A * 2/1997 Hutter, III ................ B64C 1/12
244/132
(Continued)

FOREIGN PATENT DOCUMENTS

DE    20 2012 101 435 U1    5/2012
JP    55-140826    10/1980
(Continued)

OTHER PUBLICATIONS

International Preliminary Report on Patentability (PCT/IB/338 & PCT/IB/373) issued in PCT Application No. PCT/JP2014/000679 dated Mar. 17, 2016, including English translation of document C2 (Japanese-language Written Opinion (PCT/ISA/237)) previously filed on Feb. 16, 2016 (ten (10) pages).
(Continued)

*Primary Examiner* — Roberta Delisle
(74) *Attorney, Agent, or Firm* — Crowell & Moring LLP (57) ABSTRACT

A cap of a linear guide device includes a receiving part configured to receive hitting of a hitting jig, a fitting part extending from the receiving part, having an outer diameter to be an interference with the counterbore part, and being press-fitted into the counterbore part, a foreign material receiving groove arranged at an outer circumference of the fitting part, and configured to receive a foreign material generated from the fitting part when the cap is hit into the counterbore part, and a gas discharge groove extending to reach an inside of the counterbore part from the foreign material receiving groove, with the fitting part being press-fitted into the counterbore part at the outer circumference of the fitting part, and configured to discharge a gas in the inside of the counterbore part to a foreign material receiving groove side.

7 Claims, 6 Drawing Sheets (51) Int. Cl.
*F16C 33/72* (2006.01)
*F16C 29/06* (2006.01)
*F16C 29/00* (2006.01)

(58) Field of Classification Search
USPC .................................. 411/372.5, 372.6, 373
See application file for complete search history.

(56) References Cited

U.S. PATENT DOCUMENTS

| | | | | | |
|---|---|---|---|---|---|
| 5,622,433 | A * | 4/1997 | Suzuki | ............... | B23Q 11/08 384/15 |
| 5,749,670 | A * | 5/1998 | Astor | ............... | F16B 37/14 29/525.14 |
| 5,752,795 | A * | 5/1998 | D'Adamo | ............... | F16B 37/14 411/373 |
| 6,764,067 | B2 * | 7/2004 | Kashiwagi | ............... | B23Q 11/085 269/73 |
| 7,883,269 | B2 * | 2/2011 | Iida | ............... | F16C 29/004 215/224 |
| 7,938,610 | B2 * | 5/2011 | Kishida | ............... | F16B 37/14 411/429 |
| 8,328,422 | B2 * | 12/2012 | Lin | ............... | F16C 29/0609 384/43 |
| 2006/0260425 | A1 * | 11/2006 | Mizumura | ............... | F16C 29/082 74/89.32 |
| 2010/0040314 | A1 * | 2/2010 | Lin | ............... | F16C 29/082 384/44 |
| 2010/0183252 | A1 | 7/2010 | Lin et al. | | |
| 2014/0377034 | A1 * | 12/2014 | Cottrell | ............... | F16B 29/00 411/315 |

FOREIGN PATENT DOCUMENTS

| | | |
|---|---|---|
| JP | 56-26962 Y2 | 6/1981 |
| JP | 3046445 U | 3/1998 |
| JP | 2001-37580 A | 2/2001 |
| JP | 3203115 B2 | 8/2001 |
| JP | 2002-227838 A | 8/2002 |
| JP | 2007-192282 A | 8/2007 |
| JP | 4551871 B2 | 9/2010 |
| JP | 2012-247228 A | 12/2012 |
| JP | 2013-151979 A | 8/2013 |

OTHER PUBLICATIONS

International Search Report (PCT/ISA/210) issued in PCT Application No. PCT/JP2014/000679 dated May 13, 2014 with English translation (Four (4) pages).
Japanese-language Written Opinion (PCT/ISA/237) issued in PCT Application No. PCT/JP2014/000679 dated May 13, 2014 (Five (5) pages).
European Search Report issued in counterpart European Application No. 14842465.8 dated Apr. 7, 2017 (seven pages).

* cited by examiner

CAP OF LINEAR GUIDE DEVICE AND LINEAR GUIDE DEVICE

TECHNICAL FIELD

This invention relates to a cap for closing a mounting hole provided at a guide rail of a linear guide device, and the linear guide device.

BACKGROUND ART

Figure 6:
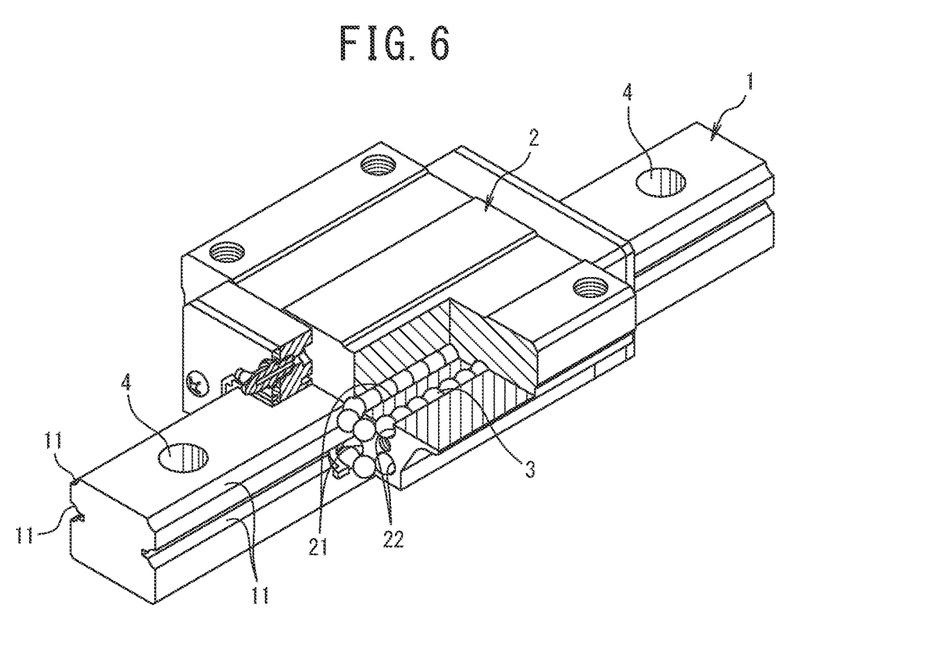
FIG. 6 is a partially cutaway perspective view illustrative of a linear guide device.

The linear guide device, as illustrated in FIG. 6, includes a guide rail 1, a slider 2, and plural rolling elements 3. The guide rail 1 and the slider 2 are arranged to oppose to each other, and respectively have rolling surfaces 11 and 21 for forming a rolling passage of the rolling elements 3. The slider 2 includes a return passage 22 of the rolling elements 3, and a direction changing passage for communicating the return passage 22 with the rolling passage. Then, a circulation path of the rolling elements is configured with the rolling passage, the return passage, and the direction changing passage. The rolling elements 3 circulating through this circulation path cause, and one of the guide rail 1 and the slider 2 relatively move in a linear manner to the other thereof.

The guide rail 1 of the linear guide device includes mounting holes 4 used for mounting the guide rail 1 onto a mounted part of a base or the like, by use of a bolt, not illustrated.

Figure 7:
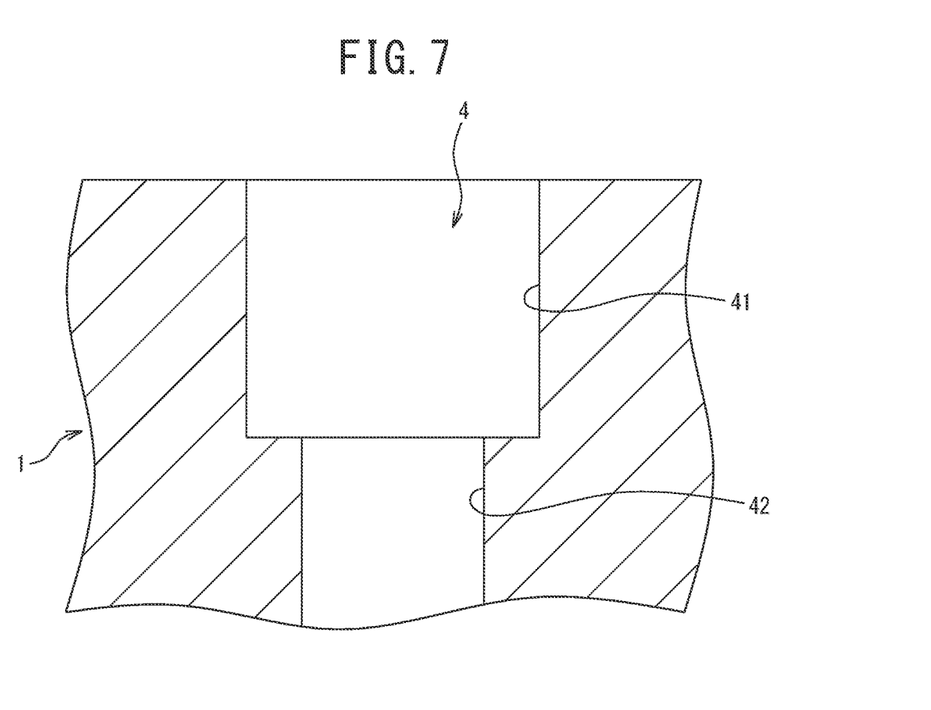
FIG. 7 is a cross-sectional view illustrative of the mounting hole of the guide rail.

The mounting hole 4, as illustrated in FIG. 7, includes a counterbore part 41 for accommodating the head of the bolt, and a shaft accommodation part 42 for accommodating the shaft of the bolt. By inserting the bolt into the mounting hole 4 and threadedly engaging the bolt with the mounted part, the guide rail 1 is secured with the bolt to the mounted part, such as a base. Subsequently, in a conventional example, the upper part of the counterbore part 41 is closed with the cap, not illustrated, for the purpose of preventing entrance of a foreign material, such as burr.

The cap disclosed in Patent Literature 1 is known as an example of the cap. In a linear guide unit disclosed in Patent Literature 1, a plug for clogging a mounting hole on a top face of the raceway rail is provided. The plug is made of iron or stainless steel, includes a disc-shaped top plate part to be substantially flush with the top face of the raceway, and a cylindrical skirt part extending downward in a vertical direction from the top plate part. The outer circumferential part of the plug includes a lid part, which is an outer circumferential part of the top plate part, and which closes the mounting hole, a concaved circumferential groove part, which is an outer circumferential part of the skirt part, and which is made by reducing the thickness of the skirt part, and an engagement part, which is engaged and adhered to the mounting hole, and which includes an interference with the mounting hole.

In the linear guide unit disclosed in Patent literature 1 including the above-described plug, when the plug is inserted into the mounting hole, foreign materials such as burr generated from the engagement part can be prevented from moving to the top face of the raceway rail, by holding the materials in the concaved circumferential groove part.

CITATION LIST

Patent Literature

PLT 1: JP Patent Number 4551871 B

SUMMARY

Technical Problem

In the linear guide unit illustrated in Patent Literature 1, however, following problems can be found.

In the linear guide unit disclosed in Patent Literature 1, in order to attach the plug, the plug is hit and inserted into the mounting hole, by hitting the top of the plug with a hitting tool like a hammer. On this occasion, the pressure is increased in a space made by the mounting hole and the plug, in particular, the space made by the mounting hole and the engagement part. Such an increased pressure does not permit the insertion of the plug into the mounting hole. The top face of the plug is floated from the mounting hole to be higher than the top surface of the guide rail, resulting in an uneven top surface of the guide rail.

Accordingly, the present invention has been made in view of the above circumstances, and has an object of providing a cap of a linear guide device and the linear guide device, in which at the time of attaching the cap acting as a cap for closing the counterbore part for accommodating the bolt head in the mounting hole arranged at the guide rail, neither a depression nor a projection is generated on the top surface of the guide rail.

Solution to Problem

In order to solve the above problem, according to one aspect of the present invention, there is provided a cap of a linear guide device, the cap being configured to close a counterbore part of a mounting hole arranged on a guide rail of the linear guide device, by being hit and press-fitted into the counterbore part with a hitting jig, the mounting hole including the counterbore part that accommodates a head part of a bolt, and a shaft accommodation part that accommodates a shaft part of the bolt. The cap includes: a receiving part configured to receive hitting of the hitting jig; a fitting part extending from the receiving part, having an outer diameter to be an interference with the counterbore part, and being press-fitted into the counterbore part; a foreign material receiving groove at an outer circumference of the fitting part, and configured to receive a foreign material generated from the fitting part when the cap is hit and inserted into the counterbore part; and a gas discharge groove extending to reach an inside of the counterbore part from the foreign material receiving groove, with the fitting part being press-fitted into the counterbore part at the outer circumference of the fitting part, and configured to discharge a gas in the inside of the counterbore part to a foreign material receiving groove side.

In the above-described linear guide device, by hitting the cap from above the receiving part with a hitting jig like a hammer to hit and insert the cap into the counterbore part of the mounting hole, the engagement part is partially scraped off and foreign materials such as burr enter the foreign material receiving groove (bur receiving groove). Accordingly, since the foreign materials such as burr are not left on the top surface of the guide rail, neither a depression nor a projection remains on the top surface of the guide rail.

In addition, the cap includes a gas discharge groove, which extends and reaches the inside of the counterbore part from the foreign material receiving groove with the fitting part being press-fitted into the counterbore part at the outer circumference of the fitting part, and which discharges the gas in the inside of the counterbore part to the foreign material receiving groove side. Hence, by hitting and inserting the cap from above the receiving part with a hitting jig like a hammer, the gas in the inside of the counterbore part that is a space defined by the counterbore part of the mounting hole and the fitting part passes through the gas discharge groove and is discharged to the foreign material receiving groove side, while the cap is being hit and inserted into the mounting hole. Accordingly, an increase in pressure in the inside of the counterbore part can be reduced. Hence, it is possible to avoid the situation where the cap cannot be inserted into the mounting hole, the top surface of the cap is floated from the mounting hole to be higher than the top surface of the guide rail, and a depression or a projection is generated on the top surface of the guide rail.

In addition, in the above-described cap of the linear guide device, two of the gas discharge grooves maybe arranged at equal intervals at the circumference of the fitting part formed to have a cylindrical shape.

Further, in the above-described cap of the linear guide device, the fitting part may include a taper part configured to guide introduction of the fitting part into the counterbore part when the cap is hit, the taper part being arranged at the outer circumference and a bottom surface of the fitting part.

Furthermore, in the above-described cap of the linear guide device, when L represents a depth of the gas discharge groove, $\phi D$ represents an outer diameter of the fitting part, and $\phi d$ represents an inner diameter of the taper part, the depth L of the gas discharge groove may be set to fall within a range of $0 < L < (\phi D - \phi d)/2$.

In addition, in the above-described cap of the linear guide device, the receiving part may be formed to have a disc shape, and an annular reinforcement rib is arranged on a surface of the receiving part.

Further, in the above-described cap of the linear guide device the receiving part may be formed to have a disc shape, and a first annular reinforcement rib and a second enforcement rib radially extending toward the first annular reinforcement rib from the center of the receiving part may be arranged on a surface of the receiving part.

Furthermore, according to another aspect of the present invention, there is provided a linear guide device including: a mounting hole on a guide rail, the mounting hole including a counterbore part configured to accommodate a head part of a bolt and a shaft accommodation part configured to accommodate a shaft part of the bolt; and the above-described cap configured to close the counterbore part.

Advantageous Effects

According to the cap of the linear guide device and the linear guide device in the present invention, burr is prevented from remaining on the top surface of the guide rail. In addition, neither a depression nor a projection is generated on the top surface of the guide rail.

DESCRIPTION OF EMBODIMENTS

Embodiments of the present invention will be described below.

A cap 5 illustrated in FIG. 1A, FIG. 1B, FIG. 1C, FIG. 2, FIG. 3A, and FIG. 3B, is provided for closing a counterbore part 41 of a mounting hole 4 arranged in a linear guide device. The mounting hole 4 includes the counterbore part 41 for accommodating a head part 61 of a bolt 6, and a shaft accommodation part 42 for accommodating a shaft part 62 of the bolt 6. By hitting the cap 5 into the counterbore part 41 with a hammer 72 as a hitting jig, the cap 5 is press-fitted into the counterbore part 41, and closes the counterbore part 41.

Here, the cap 5 includes a disc-shaped flange part 52 acting as a receiving part of receiving hits of the hammer 72, and a cylindrical fitting part 54 extending from the bottom surface of the flange part 52, having an outer diameter to be interference-fitted with the counterbore part 41, and being press-fitted into the counterbore part 41. In other words, the outer diameter of the fitting part 54 is set to have a size enough for the interference fitting with a bore diameter C of the counterbore part 41 (see FIG. 2 and FIG. 3 A). Then, at a part adjacent to the flange part 52 and at the circumference of the fitting part 54, a burr accommodation groove (foreign material accommodation groove) 53 configured to accommodate burr 73, which is a foreign material generated from the fitting part 54 when the cap 5 is hit into the counterbore part 41, is arranged circumferentially. Then, as illustrated in FIG. 1A, FIG. 1B, FIG. 1C, and FIG. 2, in the fitting part 54, a taper part 51 configured to guide the introduction of the fitting part 54 into the counterbore part 41 is arranged on an outer circumferential surface 54b of the fitting part 54 and a bottom surface 54a.

For example, the cap 5 is formed by injection molding of a synthetic resin. The cap 5 made of a synthetic resin allows the manufacturing of the cap 5 at a low price. In other words, when the cap 5 is made of iron or stainless steel like Patent literature 1, the management of the interference is difficult. Depending on the variation in radial dimension in the manufacturing, there is a problem that press-fitting into the counterbore part 41 is difficult or a gap becomes larger. Therefore, there is a request for improving the dimensional accuracy of the cap 5, but this leads to increased manufacturing costs. In contrast, when the cap 5 is made of a synthetic resin, its flexibility allows easy management of the interference, and the variation in radial dimension in the manufacturing can be permitted. This configuration enables the manufacturing cost of the cap 5 to be reduced.

The material of the cap 5 will be described below in detail.

The vibration generated when the slider 2 (see FIG. 6) moves over the guide rail 1 degrades the interference between the fitting part 54 and the counterbore part 41. By this degradation, the cap 5 might be dropped into the counterbore part 41. For this reason, any material superior in abrasion resistance is good, as a material of the cap 5. In addition, it is necessary to prevent any deformation or the like of the cap 5 to be caused by a lubricant applied on the top surface of the guide rail 1 from the slider 2 that is moving. For this purpose, the plastic applicable to the material of the cap 5 may be polyamide, polyacetal, or the like. Further, polyamide-based thermoplastic elastomer maybe applicable to the thermoplastic elastomer. In consideration of the molding shrinkage property of the cap 5, polyamide-based plastic or polyamide-based elastomer may be applicable. Further, in consideration of the heat resistance, polyamide-based resin may be applicable. Moreover, the flange part 52 of the cap 5 is hit with a hitting jig like the hummer 72 from above the cap 5 in order to insert the cap 5 into the counterbore part 41 of the mounting hole 4. For this reason, in consideration of the impact resistance, nylon 6 may be applicable to the polyamide-based plastic.

Figure 2:
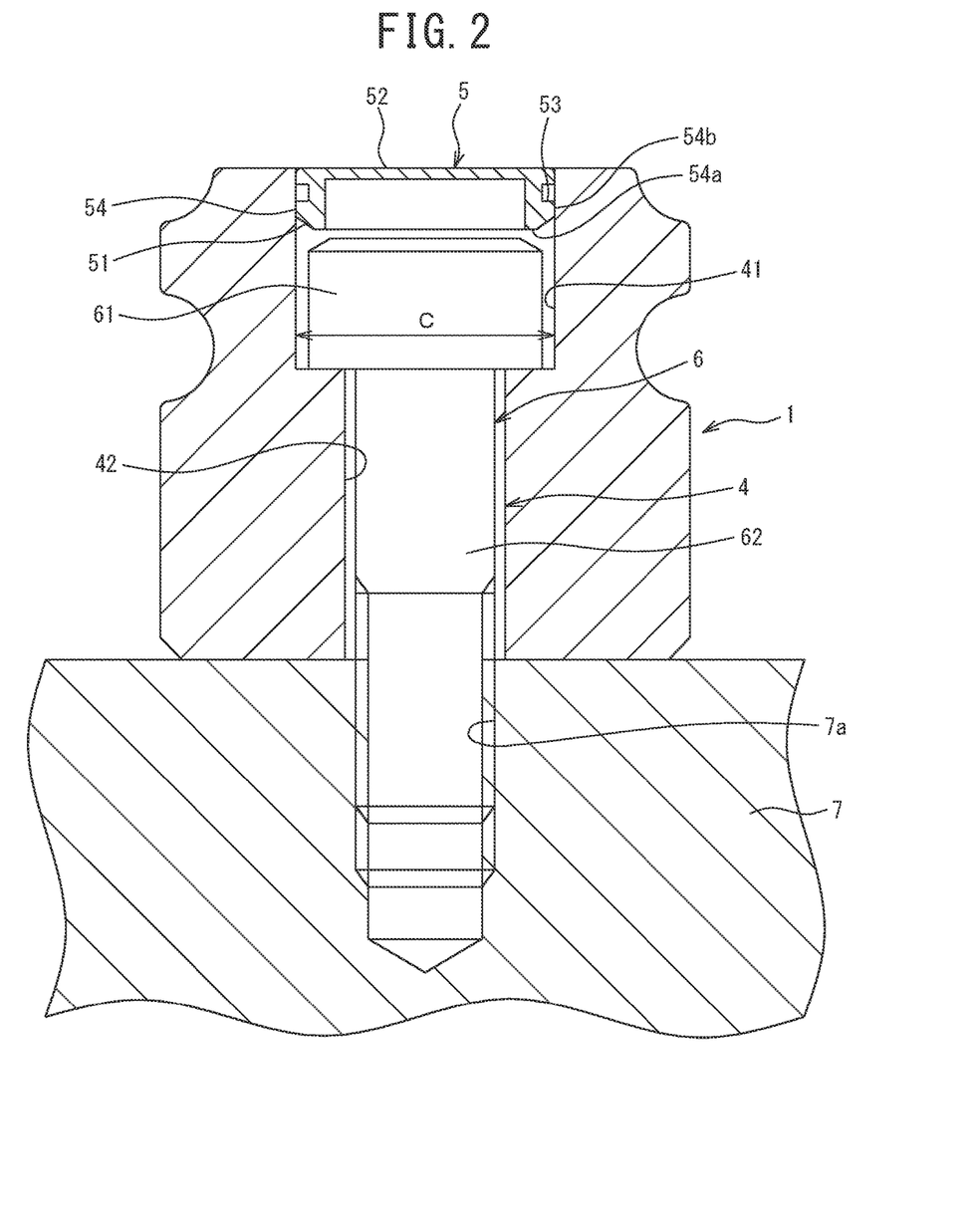
FIG. 2 is a cross-sectional view illustrative of a state where a guide rail is secured to a mounted part with a bolt inserted from a mounting hole and the cap is attached into a counterbore part of the mounting hole.

FIG. 2 illustrates a state where the guide rail 1 is secured to a mounted part 7 by a bolt 6 inserted from the mounting hole 4 and the cap 5 is attached to the counterbore part 41 of the mounting hole 4. The bolt 6 includes a head part 61 and a shaft part 62. By inserting the bolt 6 into the mounting hole 4 of the guide rail 1 to threadedly engage the shaft part 62 with a female thread 7a formed at the mounted part 7, the guide rail 1 is secured to the mounted part 7.

The mounting hole 4 of the guide rail 1 includes a counterbore part 41 configured to accommodate the head part 61 of the bolt 6, and a shaft accommodation part 42 configured to accommodate the shaft part 62. The counterbore part 41 is a circular bore, into which the fitting part 54 of the cap 5 is press-fitted, and into which the flange part 52 fits, and its bore diameter is C, as illustrated in FIG. 2 and FIG. 3A.

When the cap 5 is attached to the mounting hole 4, a bottom surface 54a of the fitting part 54 is made to face the bolt 6 side. The cap 5 is placed at an upper part of the counterbore part 41 of the mounting hole 4 formed at the guide rail 1, and the top surface of the flange part 52 of the cap 5 is hit with the hammer 72. Hence, the fitting part 54 of the cap 5 is press-fitted into the counterbore part 41, while being elastically deformed, and the flange part 52 fits into the counterbore part 41. Then, the top surface of the flange part 52 is flush with the top surface of the guide rail 1.

Figure 3A:
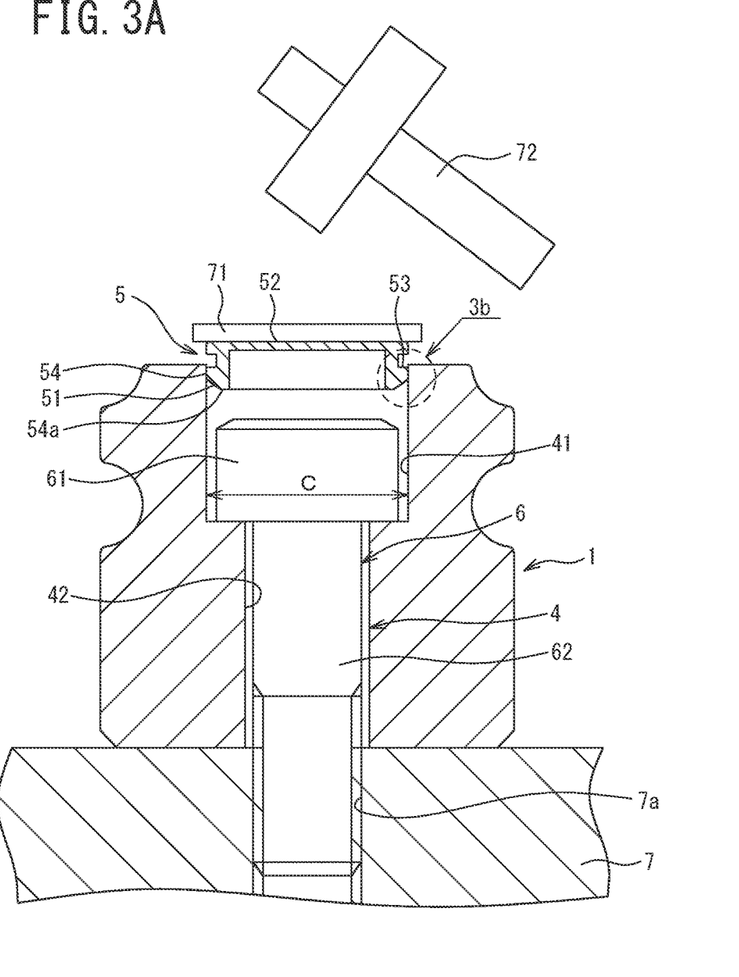
FIG. 3A is a cross-sectional view illustrative of a state where the top of the cap is hit by a hammer with a cover plate being placed on the top of the cap illustrated in FIG. 1A to FIG. 1C, and the cap is attached in the counterbore part of the mounting hole.

It is to be noted that as illustrated in FIG. 3A, for hitting the top surface of the flange part 52 of the cap 5 with the hammer 72, a cover plate 71 is placed on the top surface of the flange part 52 of the cap 5, and then the cover plate 71 is hit with the hammer 72.

Here, the fitting part 54, as described above, includes the taper part 51 arranged on an outer circumferential surface 54b and a bottom surface 54a of the fitting part 54 and configured to guide the introduction of the fitting part 54 to the counterbore part 41, when the cap 5 is hit and inserted into the counterbore part 41. This configuration enables the fitting part 54 to be introduced into the counterbore part 41 easily.

Figure 3B:
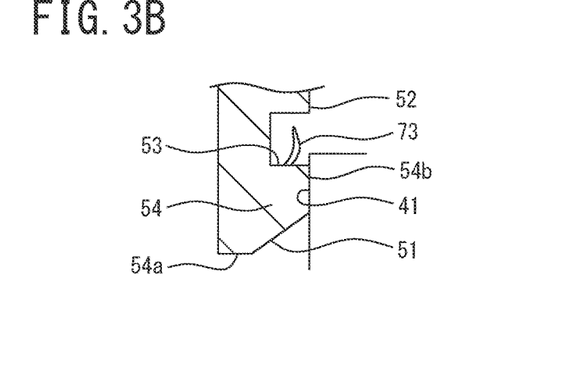
FIG. 3B is a view illustrative of burr in the counterbore part of the mounting hole to be received by a burr receiving groove.

Then, when the cap 5 is hit and inserted into the counterbore part 41 of the mounting hole 4, as illustrated in FIG. 3B, the fitting part 54 to be press-fitted into the counterbore part 41 is partially scraped off by the guide rail 1. Burr 73 generated accordingly enters a burr receiving groove 53 of the cap 5. Hence, there is no possibility that the burr 73 remains on the top surface of the guide rail 1.

Thus, in the afore-mentioned embodiment, there is no possibility that the burr 73 is piled up on the top surface of the guide rail 1.

In hitting and inserting the cap 5 into the counterbore part 41 of the mounting hole 4, the burr 73 is generated as described above, when the fitting part 54 passes through the side surface of the counterbore part 41. However, the side surface of the counterbore part 41 becomes smooth due to frictional wearing with the side surface of the fitting part 54.

Therefore, by the time when the side surface of the flange part 52 passes through the side surface of the counterbore part 41 after the fitting part 54 passes through the side surface of the counterbore part 41, the side surface of the counterbore part 41 becomes smooth. Hence, the burr is hardly generated from the side surface of the flange part 52.

In addition, when the cap 5 is hit and inserted into the mounting hole 4, the pressure increases in the inside of the mounting hole 4 that is a space defined by the counterbore part 41 of the mounting hole 4 and the fitting part 54. The increased pressure floats the cap 5 from the top surface of the guide rail 1, and may result in unevenness on the top surface of the guide rail 1. In the present embodiment, in order to prevent an increase in the pressure, as illustrated in FIG. 1A, FIG. 1B, FIG. 1C, and FIG. 2, the cap 5 includes a gas discharge groove extending and reaching the inside of the counterbore part 41 from the burr receiving groove 53, with the fitting part 54 being press-fitted into the counterbore part 41 at the outer circumference of the fitting part 54, and configured to discharge the gas in the counterbore part 41 to the burr receiving groove 53 side. As illustrated in FIG. 1B, two gas discharge grooves 55 are arranged at equal intervals at the outer circumference of the fitting part 54. The gas discharge groove 55 has a circular arc cross-section.

In the present embodiment, the cap 5 extends and reaches the inside of the counterbore part 41 with the fitting part 54 being press-fitted in the counterbore part 41 at the outer circumference of the fitting part 54, and includes the gas discharge groove configured to discharge the gas in the counterbore part 41 to the burr receiving groove 53 side. By hitting the cap 5 from above the flange part 52 with the hammer 72 to insert the cap 5 into the mounting hole 4, the gas in the inside of the counterbore part 41, which is the space defined by the counterbore part 41 of the mounting hole 4 and the fitting part 54, passes through the gas discharge groove 55 and is discharged to the burr receiving groove 53 side. Accordingly, the increased pressure in the counterbore part 41 can be reduced. The above configuration prevents the possibility that the cap 5 cannot be inserted into the mounting hole 4, the top surface of the cap 5 is floated from the mounting hole 4 to be higher than the top surface of the guide rail 1, and unevenness on the top surface of the guide rail 1 is made.

Here, the gas discharge groove 55 is arranged at the outer circumference of the fitting part 54. Hence, each of the gas discharge grooves 55 is not destroyed by the hammer 72 when the flange part 52 is hit with the hammer 72.

Figure 1A:
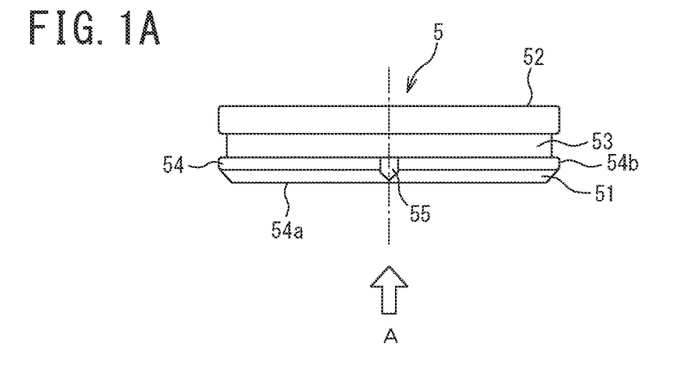
FIG. 1A is a front view illustrative of a cap in one embodiment of the present invention.
Figure 1B:
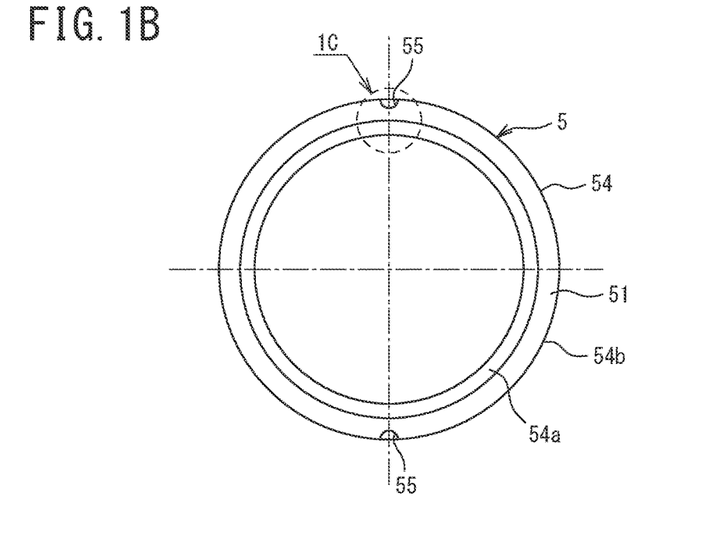
FIG. 1B is a view when the cap of FIG. 1A is viewed from an arrow A.
Figure 1C:
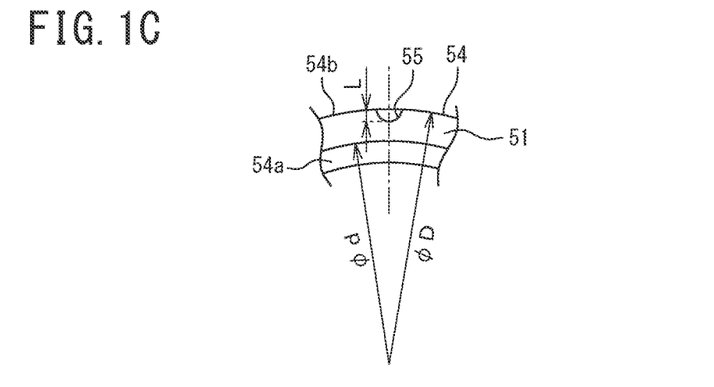
FIG. 1C is a view illustrative of a depth of a foreign material receiving groove arranged at a cap, an outer diameter $\phi D$ of the fitting part, and an inner diameter $\phi d$ of a taper part.

In addition, as illustrated in FIG. 1C, when L represents a depth of the gas discharge groove 55, φD represents an outer diameter of the fitting part 54, and φd represents an inner diameter of the taper part 51, the depth L of the gas discharge groove 55 is set to fall within a range of 0<L< (φD−φd)/2. The thickness at the gas discharge groove 55 is ensured, and degradation of strength of the whole cap 5 is prevented. If L=0, there is no gas discharge groove 55.

Figure 4A:
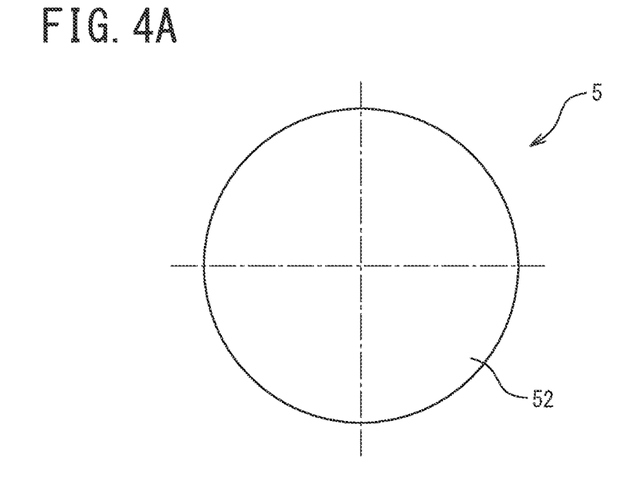
FIG. 4A is a plan view illustrative of a cap in a first modification example.
Figure 4B:
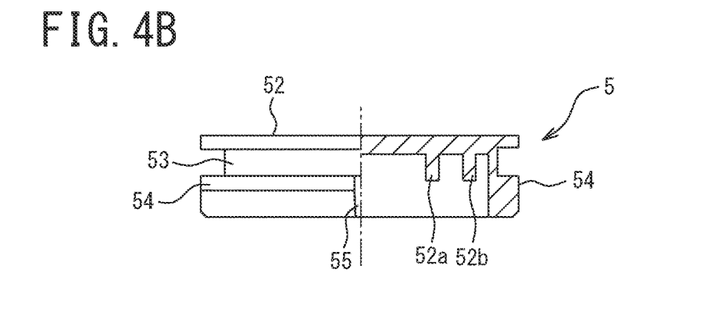
FIG. 4B is a partially cutaway front view illustrative of the cap in the first modification example.
Figure 4C:
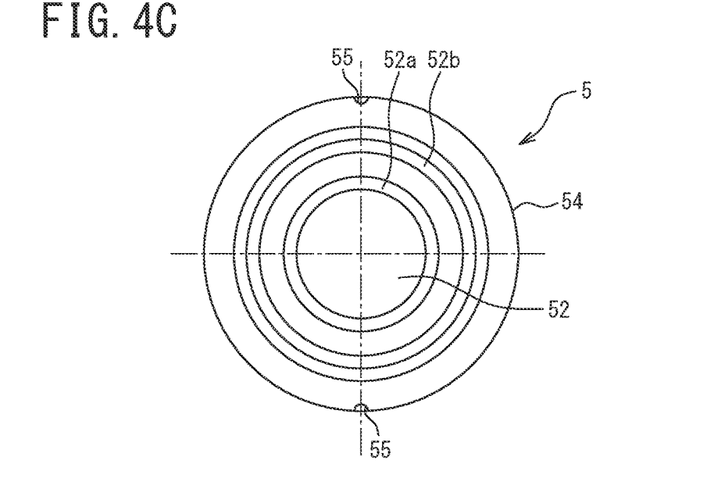
FIG. 4C is a bottom view illustrative of the cap in the first modification example.
Figure 5A:
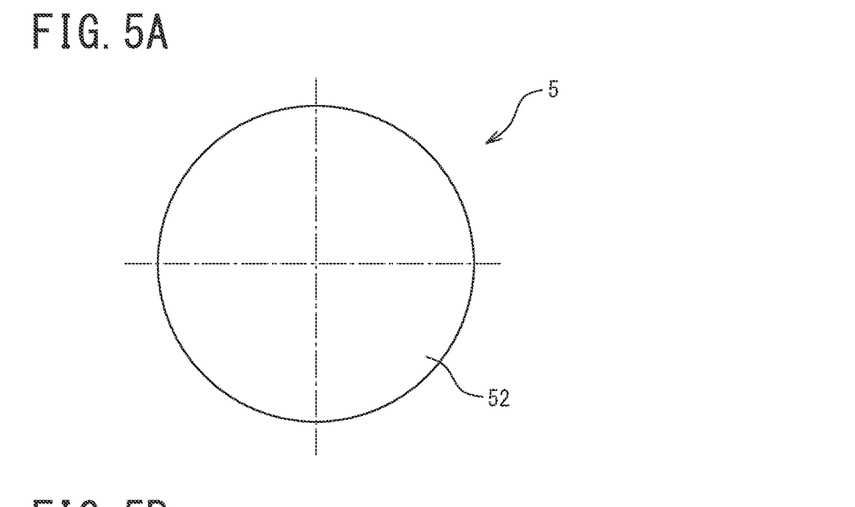
FIG. 5A is a plan view illustrative of a cap in a second modification example.
Figure 5B:
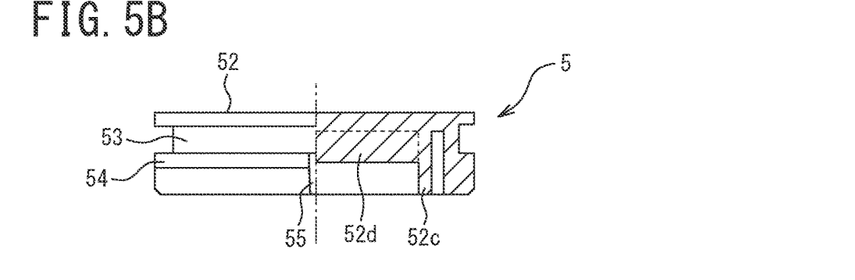
FIG. 5B is a partially cutaway front view illustrative of the cap in the second modification example.
Figure 5C:
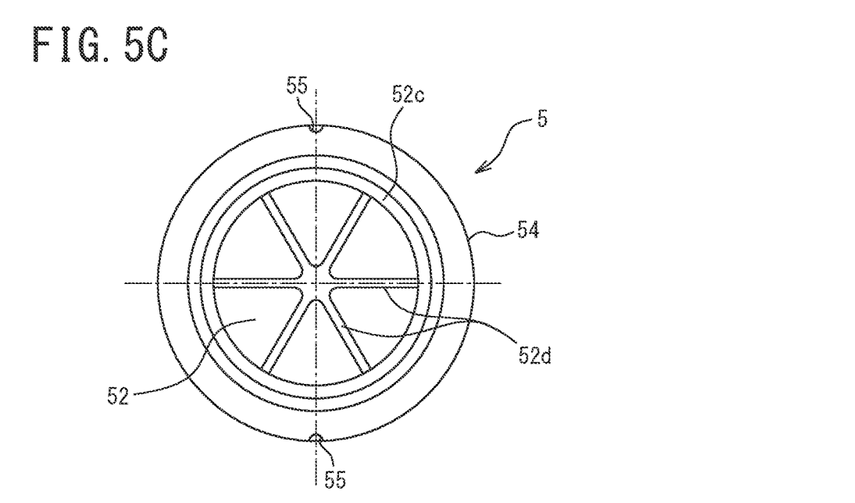
FIG. 5C is a bottom view illustrative of the cap in the second modification example.

Next, a first modification example of the cap will be described by referring to FIG. 4A, FIG. 4B, and FIG. 4C, and a second modification example of the cap will be described by referring to FIG. 5A, FIG. 5B, and FIG. 5C. In FIG. 4A, FIG. 4B, and FIG. 4C, and FIG. 5A, FIG. 5B, and FIG. 5C, same components as those of FIG. 1A, FIG. 1B, and FIG. 1C have same reference numerals and their descriptions will be omitted, in some cases.

Firstly, as illustrated in FIG. 4A, FIG. 4B, and FIG. 4C, the cap 5 in the first modification example is similar in basic configuration to the cap 5 of FIG. 1A, FIG. 1B, and FIG. 1C, but is different in that a first annular reinforcement rib 52a and a second annular reinforcement rib 52b are provided on the bottom surface of the flange part 52 formed to have a disc shape.

Here, the first reinforcement rib 52a, as illustrated in FIG. 4C, is formed to have an annular shape at the bottom surface of the flange part 52, with the center of the flange part 52 being set as the center. As illustrated in FIG. 4B, the first reinforcement rib 52a extends partway from the bottom surface of the flange part 52 before reaching the bottom surface of the fitting part 54.

In addition, the second reinforcement rib 52b, as illustrated in FIG. 4C, is formed in annular shape having a diameter larger than the diameter of the first reinforcement rib 52a at the bottom surface of the flange part 52, with the center of the flange part 52 being set as the center, and is arranged to be spaced apart from the first reinforcement rib 52a at a predetermined interval. Then, the second reinforcement rib 52b, as illustrated in FIG. 4B, extends partway from the bottom surface of the flange part 52 before reaching the bottom surface of the fitting part 54. The bottom surface of the fitting part 54, the first reinforcement rib 52a, and the second reinforcement rib 52b may have the same height. However, since the cap 5, in which the first reinforcement rib 52a and the second reinforcement rib 52b extend partway from the bottom surface of the fitting part 54 before reaching the bottom surface of the flange part 52 (that is, neither the first reinforcement rib 52a nor the second reinforcement rib 52b reaches the bottom surface of the fitting part 54), has a small contact surface with the gas, it is easy to hit and insert the cap 5.

The provisions of the first annular reinforcement rib 52a and the second annular reinforcement rib 52b on the bottom surface of the flange part 52 as described above enhance the rigidity of the flange part 52. When the flange part 52 is hit with the hammer 72, deformation of the flange part 52 can be prevented. Accordingly, when the cap 5 is hit and inserted into the mounting hole 4, the inconvenience that the top surface of the flange part 52 is not flush with the top surface of the guide rail 1, which is caused by the deformation of the flange part 52, can be prevented.

It is to be noted that as the reinforcement ribs, the first reinforcement rib 52a and the second reinforcement rib 52b are arranged on the bottom surface of the flange part 52. However, one reinforcement rib or three or more reinforcement ribs may be provided. Further, when plural reinforcement ribs are provided, the interval between the reinforcement ribs is an arbitrary one, without limiting to the example illustrated in FIG. 4C.

Next, the cap 5 in the second modification example, as illustrated in FIG. 5A, FIG. 5B, and FIG. 5C is similar in basic configuration to the cap 5 of FIG. 1A, FIG. 1B, and FIG. 1C, but is different in that the first annular reinforcement rib 52c and plural (six in the present example) second reinforcement ribs 52d radially extending toward the first annular reinforcement rib 52c are provided on the bottom surface of the flange part 52.

Here, the first reinforcement rib 52c, as illustrated in FIG. 5C, is formed in annular shape at the bottom surface of the flange part 52, with the center of the flange part 52 being set as the center, and extends from the bottom surface of the flange part 52 to reach the bottom surface of the fitting part 54, as illustrated in FIG. 5B.

In addition, each of the second reinforcement ribs 52d, as illustrated in FIG. 5C, extends radially from the center of the flange part 52 on the bottom surface of the flange part 52 toward the first reinforcement rib 52c, and in addition, as illustrated in FIG. 5B, extends partway from the bottom surface of the flange part 52 before reaching the bottom surface of the fitting part 54.

As described above, the first annular reinforcement rib 52c and the second reinforcement ribs 52d extending radially toward the first reinforcement rib 52c are provided on the bottom surface of the flange part 52. This configuration enhances the rigidity of the flange part 52 more than the rigidity in the modification example 1. When the flange part 52 is hit with the hammer 72 deformation of the flange part 52 can be prevented in a more effective manner. Accordingly, when the cap 5 is hit and inserted into the mounting hole 4, the inconvenience that the top surface of the flange part 52 is not flush with the top surface of the guide rail 1, which is caused by the deformation of the flange part 52, can be prevented.

It is to be noted that one first reinforcement rib 52c is provided, but two or more the first reinforcement ribs 52c maybe provided without limiting to its number. In addition, six second reinforcement ribs 52d are provided, but not only six but also any number of the reinforcement ribs 52d may be provided.

The embodiments of the present invention have been described so far, but the present invention is not limited to the above-described embodiments and various kinds of changes or modifications are applicable.

For example, the synthetic resin has been described as an example of the material of the cap 5, but the material of the cap 5 in the present invention is not limited to the synthetic resin and may be metal such as aluminum alloy, copper alloy, or steel.

Further, the hitting jig for hitting the cap 5 is not limited to the hammer 72.

Moreover, any foreign material generated from the fitting part 54 at the time of hitting the cap 5 into the counterbore part 41 may be applicable, without limiting to the burr 73.

REFERENCE SIGNS LIST 1 guide rail
2 slider
11 rolling surface
21 rolling surface
22 return passage
3 rolling element
4 mounting hole 41 counterbore part
42 shaft accommodation part
5 cap
51 taper part
52 flange (receiving part)
52a first reinforcement rib (reinforcement rib)
52b second reinforcement rib (reinforcement rib)
52c first reinforcement rib
52d second reinforcement rib
53 burr receiving groove (foreign material receiving groove)
54 fitting part
54a bottom surface of the fitting part
54b outer circumferential surface of the fitting part
55 gas discharge groove
6 bolt
61 head part of the bolt
62 shaft part of the bolt
7 mounted part
7a female thread
71 cover plate
72 hammer (hitting jig)
73 burr (foreign material)

The invention claimed is:

1. A cap of a linear guide device, the cap being configured to close a counterbore part of a mounting hole arranged on a guide rail of the linear guide device, by being hit and press-fitted into the counterbore part with a hitting jig, the mounting hole comprising the counterbore part that accommodates a head part of a bolt, and a shaft accommodation part that accommodates a shaft part of the bolt, the cap comprising:

a receiving part configured to receive hitting of the hitting jig;

a fitting part extending from the receiving part, having an outer diameter to be an interference with the counterbore part, and being press-fitted into the counterbore part;

a foreign material receiving groove at an outer circumference of the fitting part, and configured to receive a foreign material generated from the fitting part when the cap is hit and inserted into the counterbore part; and a gas discharge groove extending to reach an inside of the counterbore part from the foreign material receiving groove, with the fitting part being press-fitted into the counterbore part at the outer circumference of the fitting part, and configured to discharge a gas in the inside of the counterbore part to a foreign material receiving groove side, wherein the gas discharge groove is arranged at the outer circumference of the fitting part, which is located between the counterbore part and the foreign material receiving groove.

2. The cap of the linear guide device according to claim 1, wherein two of the gas discharge grooves are arranged at equal intervals at the circumference of the fitting part formed to have a cylindrical shape.

3. The cap of the linear guide device according to claim 1, wherein the fitting part comprises a taper part configured to guide introduction of the fitting part into the counterbore part when the cap is hit, the taper part being arranged at the outer circumference and a bottom surface of the fitting part.

4. The cap of the linear guide device according to claim 3, wherein when L represents a depth of the gas discharge groove, $\phi D$ represents an outer diameter of the fitting part, and $\phi d$ represents an inner diameter of the taper part, the depth L of the gas discharge groove is set to fall within a range of $0<L<(\phi D-\phi d)/2$.

5. The cap of the linear guide device according to claim 1, wherein the receiving part is formed to have a disc shape, and an annular reinforcement rib is arranged on a surface of the receiving part.

6. A linear guide device comprising:

a mounting hole on a guide rail, the mounting hole comprising a counterbore part configured to accommodate a head part of a bolt and a shaft accommodation part configured to accommodate a shaft part of the bolt; and the cap according to claim 1 configured to close the counterbore part.

7. A cap of a linear guide device, the cap being configured to close a counterbore part of a mounting hole arranged on a guide rail of the linear guide device, by being hit and press-fitted into the counterbore part with a hitting jig, the mounting hole comprising the counterbore part that accommodates a head part of a bolt, and a shaft accommodation part that accommodates a shaft part of the bolt, the cap comprising:

a receiving part configured to receive hitting of the hitting jig;

a fitting part extending from the receiving part, having an outer diameter to be an interference with the counterbore part, and being press-fitted into the counterbore part;

a foreign material receiving groove at an outer circumference of the fitting part, and configured to receive a foreign material generated from the fitting part when the cap is hit and inserted into the counterbore part; and a gas discharge groove extending to reach an inside of the counterbore part from the foreign material receiving groove, with the fitting part being press-fitted into the counterbore part at the outer circumference of the fitting part, and configured to discharge a gas in the inside of the counterbore part to a foreign material receiving groove side, wherein the receiving part is formed to have a disc shape, and wherein a first annular reinforcement rib and a second enforcement rib radially extending toward the first annular reinforcement rib from the center of the receiving part are arranged on a surface of the receiving part.

* * * * *